United States Patent
Cowell, Jr.

[11] Patent Number: 6,000,891
[45] Date of Patent: Dec. 14, 1999

[54] COMBINATION NUT AND THREADED FASTENER WITH LOCKING PIN

[76] Inventor: Franklin D. Cowell, Jr., 6437 Cascade St., San Diego, Calif. 92122

[21] Appl. No.: 09/160,730

[22] Filed: Sep. 25, 1998

[51] Int. Cl.[6] .................................................. F16B 39/04
[52] U.S. Cl. .......................... 411/315; 411/200; 292/318
[58] Field of Search ................................... 411/315, 316, 411/317, 319, 320, 87, 197, 200, 201; 24/16 PB, 30.5 R; 292/318, 307 R, 319

[56] References Cited

U.S. PATENT DOCUMENTS

| 1,379,606 | 5/1921 | Ashley | 411/87 |
| 5,568,952 | 10/1996 | Ruegg | 292/318 |

FOREIGN PATENT DOCUMENTS

| 952616 | 11/1949 | France | 411/315 |
| 691655 | 6/1940 | Germany | 411/201 |
| 480948 | 5/1954 | Italy | 411/200 |
| 1524970 | 9/1978 | United Kingdom | 411/200 |

*Primary Examiner*—Flemming Saether

[57] ABSTRACT

A new Locking Nut System for locking a nut onto a conventional fastener without the nut becoming loosened thereby providing a safe, reliable and quick securing means to the conventional fastener. The inventive device includes a hexagonal nut having a plurality of radial apertures and a perimeter channel, a length of wire having a loop at one end, a protective coating covers the wire, and a plurality of traverse ribs extend from the coating opposite of the loop. The end of the wire opposite of the loop projects through a pair of aligned apertures with a passage within a fastener and then removably engages the loop with a substantial portion of the wire within the perimeter channel.

14 Claims, 4 Drawing Sheets

COMBINATION NUT AND THREADED FASTENER WITH LOCKING PIN

BACKGROUND OF THE INVENTION

1. Field of the Invention

The present invention relates to Locking Pin Devices and more particularly pertains to a new Locking Nut System for locking a nut onto a conventional fastener without the nut becoming loosened thereby providing a safe, reliable and quick securing means to the conventional fastener.

2. Description of the Prior Art

The use of Locking Pin Devices is known in the prior art. More specifically, Locking Pin Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Locking Pin Devices include U.S. Pat. No. 4,592,689; U.S. Pat. No. 4,298,299; U.S. Pat. No. 4,205,586; U.S. Pat. No. 5,217,338; U.S. Pat. No. 3,986,428 and U.S. Pat. No. 4,699,553.

While these devices fulfill their respective, particular objectives and requirements, the aforementioned patents do not disclose a new Locking Nut System. The inventive device includes a hexagonal nut having a plurality of radial apertures and a perimeter channel, a length of wire having a loop at one end, a protective coating covers the wire, and a plurality of traverse ribs extend from the coating opposite of the loop.

In these respects, the Locking Nut System according to the present invention substantially departs from the conventional concepts and designs of the prior art, and in so doing provides an apparatus primarily developed for the purpose of locking a nut onto a conventional fastener without the nut becoming loosened thereby providing a safe, reliable and quick securing means to the conventional fastener.

SUMMARY OF THE INVENTION

In view of the foregoing disadvantages inherent in the known types of Locking Pin Devices now present in the prior art, the present invention provides a new Locking Nut System construction wherein the same can be utilized for locking a nut onto a conventional fastener without the nut becoming loosened thereby providing a safe, reliable and quick securing means to the conventional fastener.

The general purpose of the present invention, which will be described subsequently in greater detail, is to provide a new Locking Nut System apparatus and method which has many of the advantages of the Locking Pin Devices mentioned heretofore and many novel features that result in a new Locking Nut System which is not anticipated, rendered obvious, suggested, or even implied by any of the prior art Locking Pin Devices, either alone or in any combination thereof.

To attain this, the present invention generally comprises a hexagonal nut having a plurality of radial apertures and a perimeter channel, a length of wire having a loop at one end, a protective coating covers the wire, and a plurality of traverse ribs extend from the coating opposite of the loop.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Locking Nut System apparatus and method which has many of the advantages of the Locking Pin Devices mentioned heretofore and many novel features that result in a new Locking Nut System which is not anticipated, rendered obvious, suggested, or even implied by any of the prior art Locking Pin Devices, either alone or in any combination thereof It is another object of the present invention to provide a new Locking Nut System which may be easily and efficiently manufactured and marketed.

It is a further object of the present invention to provide a new Locking Nut System which is of a durable and reliable construction.

An even further object of the present invention is to provide a new Locking Nut System which is susceptible of a low cost of manufacture with regard to both materials and labor, and which accordingly is then susceptible of low prices of sale to the consuming public, thereby making such Locking Nut System economically available to the buying public.

Still yet another object of the present invention is to provide a new Locking Nut System which provides in the apparatuses and methods of the prior art some of the advantages thereof, while simultaneously overcoming some of the disadvantages normally associated therewith.

Still another object of the present invention is to provide a new Locking Nut System for locking a nut onto a conventional fastener without the nut becoming loosened thereby providing a safe, reliable and quick securing means to the conventional fastener.

Yet another object of the present invention is to provide a new Locking Nut System which includes a hexagonal nut having a plurality of radial apertures and a perimeter channel, a length of wire having a loop at one end, a protective coating covers the wire, and a plurality of traverse ribs extend from the coating opposite of the loop.

Still yet another object of the present invention is to provide a new Locking Nut System that reduces the probability of an injury occurring to an individual.

Even still another object of the present invention is to provide a new Locking Nut System that is non-corrosive because of the protective coating.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
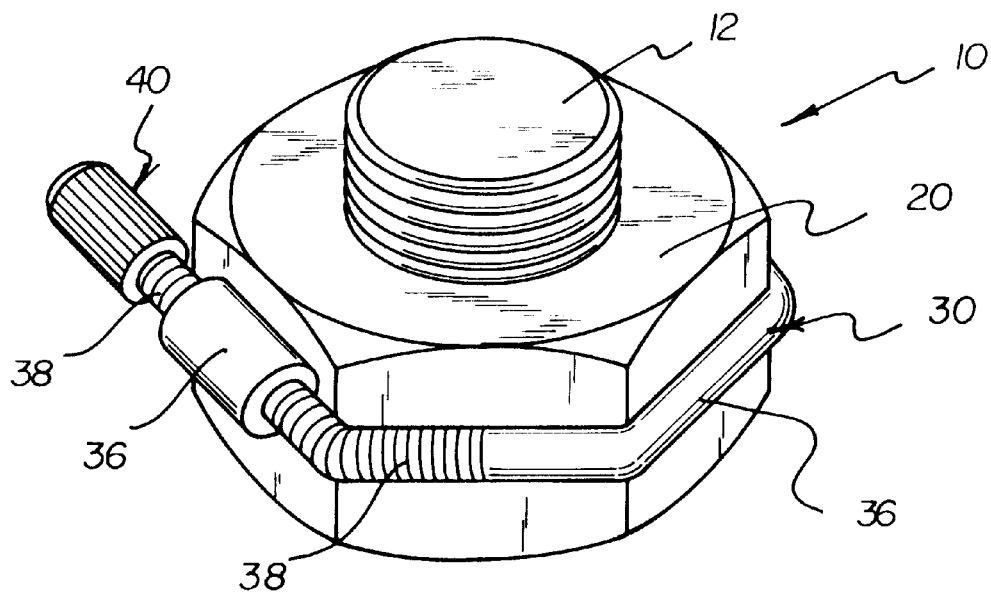
FIG. 1 is an upper perspective view of a new Locking Nut System according to the present invention.

With reference now to the drawings, and in particular to FIGS. 1 through 9 thereof, a new Locking Nut System embodying the principles and concepts of the present invention and generally designated by the reference numeral 10 will be described.

Figure 4:
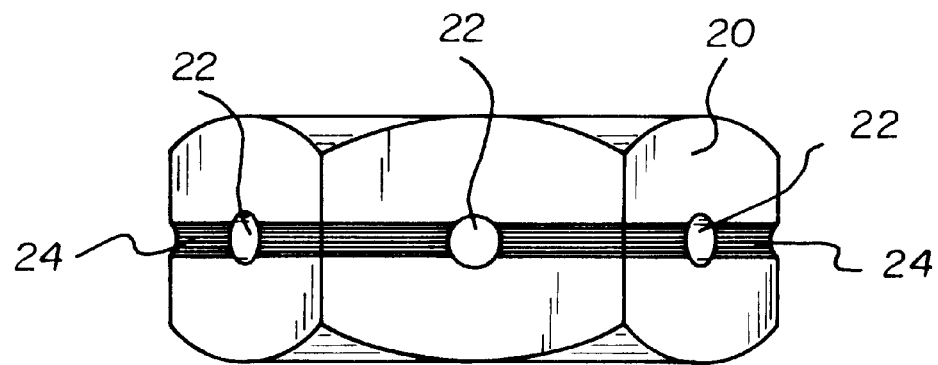
FIG. 4 is a side view of the present invention.

More specifically, it will be noted that the Locking Nut System 10 comprises a hexagonal nut 20 having a plurality of radial apertures 22, and a securing means 30 for removably projecting through the radial apertures 22 and through a traverse passage 14 within threaded fastener 12 for preventing removal of the hexagonal nut 20. As best shown in FIG. 4 of the drawings, the hexagonal nut 20 includes a perimeter channel 24 for receiving the securing means 30.

Figure 2:
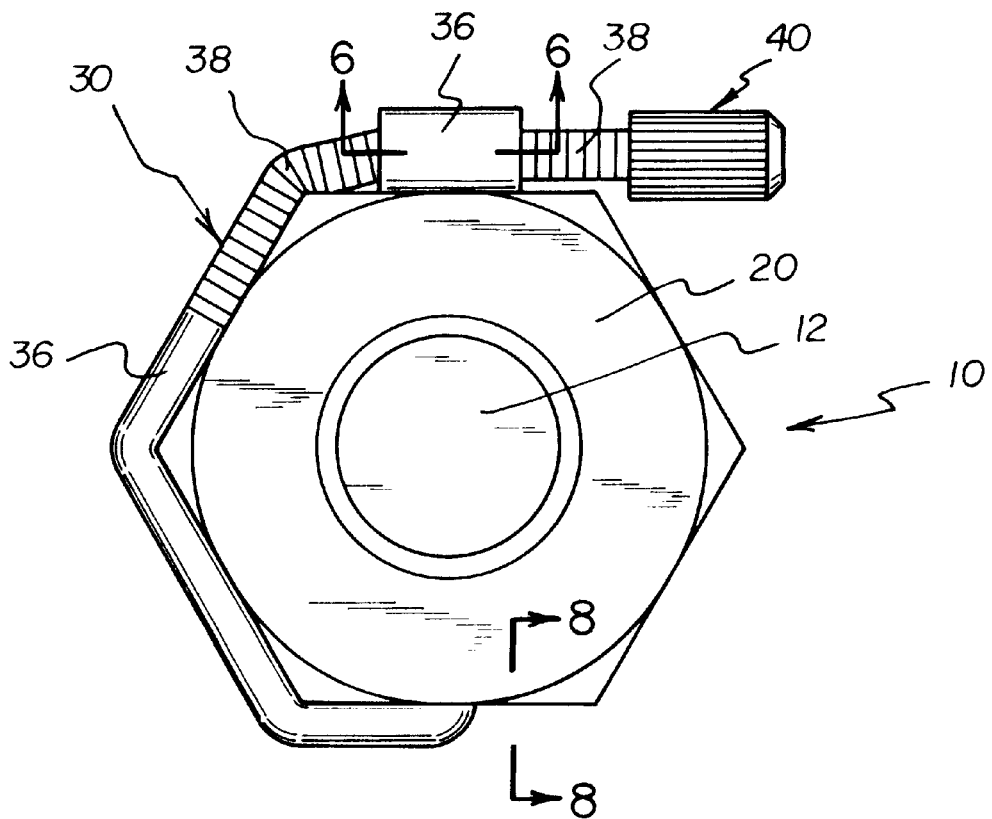
FIG. 2 is a top view of the present invention.
Figure 3:
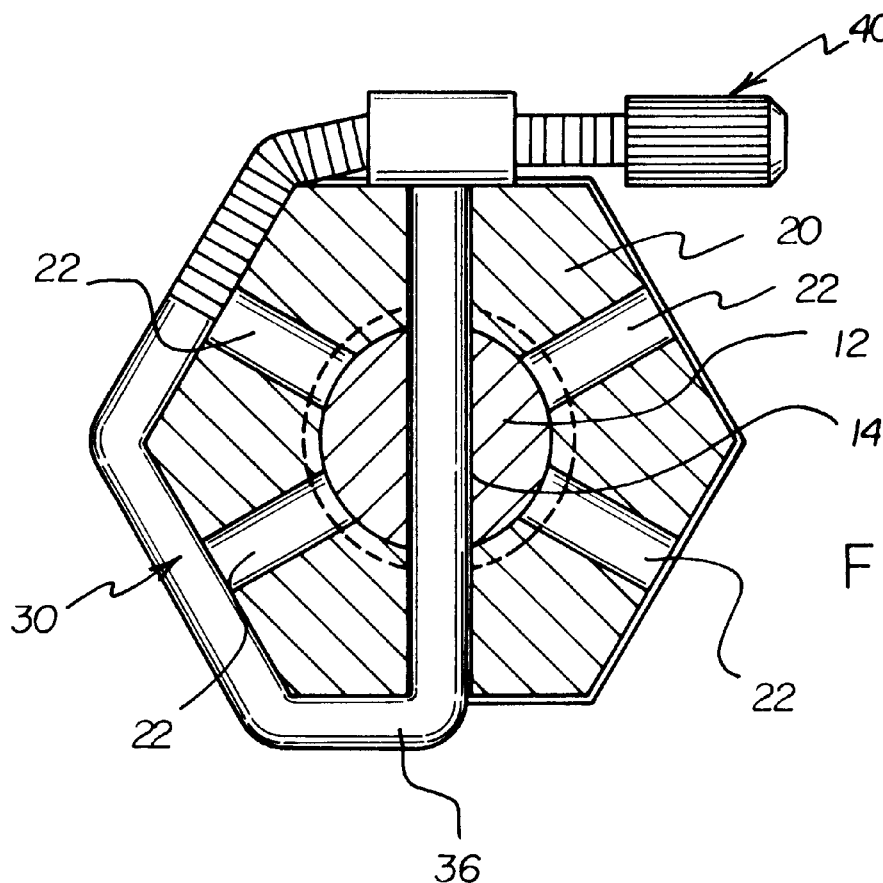
FIG. 3 is a top cut away view of the present invention.
Figure 5:
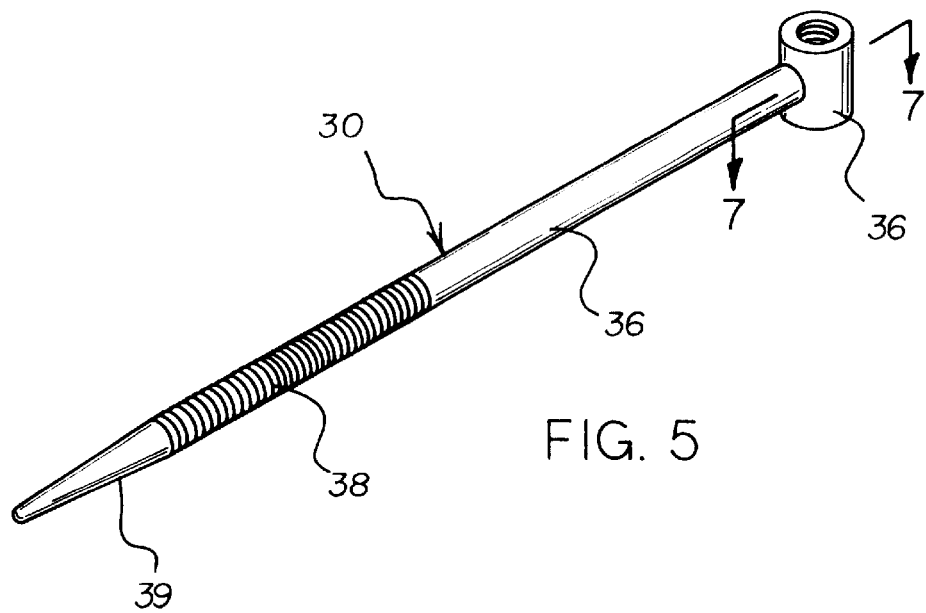
FIG. 5 is an upper perspective view of the securing means.
Figure 6:
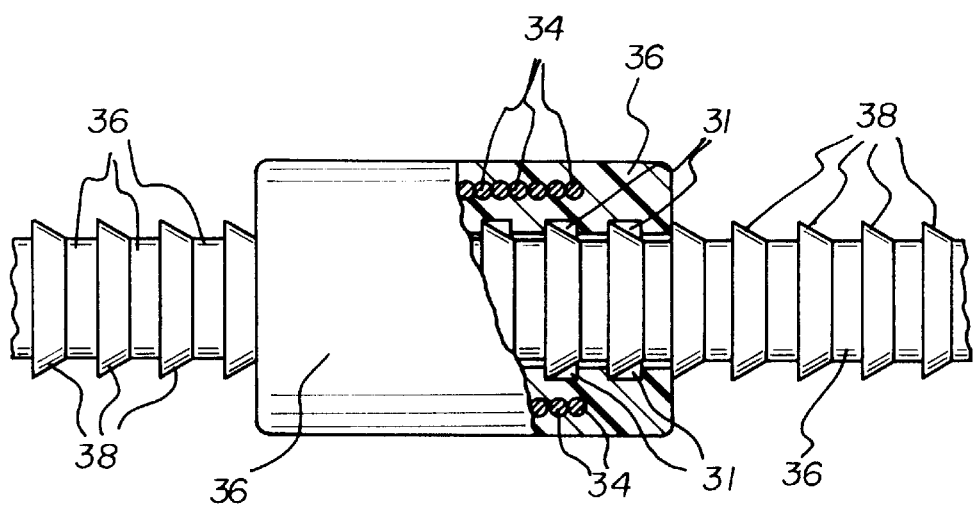
FIG. 6 is a cross sectional view taken along line 6—6 of FIG. 2.
Figure 7:
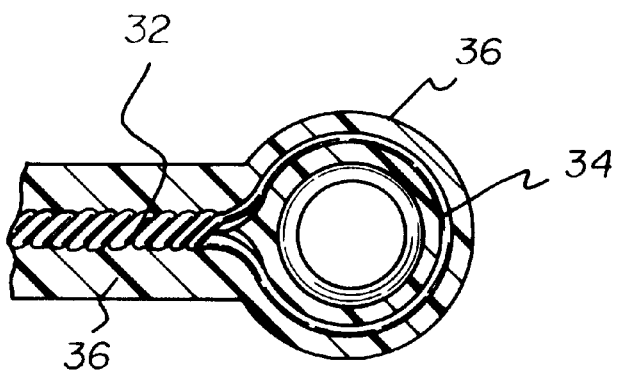
FIG. 7 is a cross sectional view taken along line 7—7 of FIG. 5 disclosing the loop.
Figure 8:
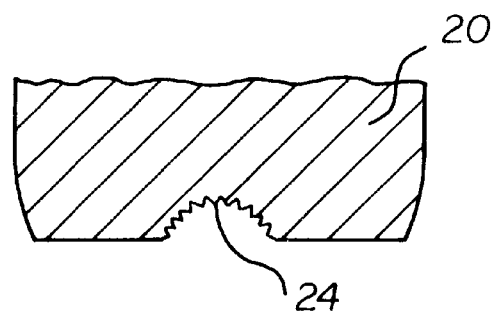
FIG. 8 is a cross sectional view taken along line 8—8 of FIG. 2 disclosing the perimeter channel.
Figure 9:
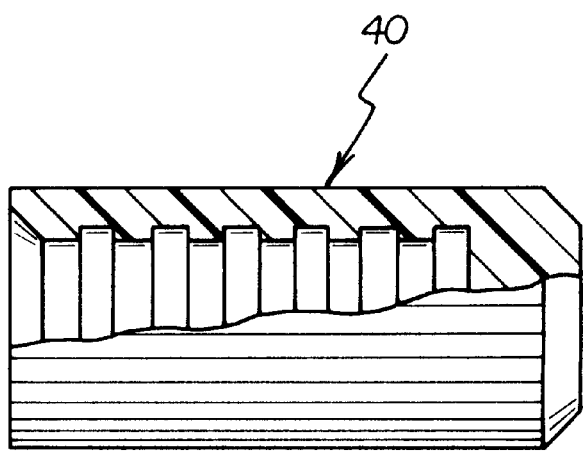
FIG. 9 is a cut away view of the protective cap.

As shown in FIGS. 1 through 9 of the drawings, the securing means 30 comprises a length of wire 32 for projecting through the radial apertures 22 and through the passage 14 of the threaded fastener 12. The wire 32 consists of a plurality of resilient wound wire 32 strands as best shown in FIGS. 6 and 7 of the drawings. The length of wire 32 has a loop 34 at one end, wherein the loop 34 is larger than the radial apertures 22 thereby preventing the loop 34 from passing through the apertures 22 as best shown in FIG. 3 of the drawings. An end of the wire 32 opposite of the loop 34 removably projects through the radial apertures 22 and the passage 14 and thereafter removably engages the loop 34 for preventing removal of the wire 32 from within the apertures 22 and the passage 14 as shown in FIGS. 1 through 3 of the drawings. Preferably as shown in FIGS. 6 and 7 of the drawings, a protective coating 36 surrounds the length of wire 32 and the loop 34 for preventing corrosion of the wire 32 and for preventing injury to a user. The protective coating 36 preferably has a plurality of traverse ribs 38 opposite of the loop 34 for engaging the loop 34 as best shown in FIG. 6 of the drawings. The protective coating 36 preferably has a tapered end 39 opposite of the loop 34 as best shown in FIG. 5 of the drawings. As best shown in FIG. 6 of the drawings, the protective coating 36 surrounding the loop 34 includes a plurality of circular interior grooves 31 for catchably receiving the traverse ribs 38. A protective cap 40 is provided for removably securing to the tapered end 39 for preventing injury to the user during utilization as best shown in FIGS. 1, 2, 3 and 9 of the drawings.

In use, the hexagonal nut 20 is threadably secured to the fastener 12. A pair of aligned radial apertures 22 are aligned with the passage 14 of the fastener 12. The tapered end 39 is inserted into one of the aligned radial apertures 22 and then through the passage 14 and then through the remaining aligned radial aperture 22. The securing means 30 is pulled through until the loop 34 engages the outer rim of the aligned aperture 22 thereby preventing further projection. The wire 32 within the protective coating 36 is bent along the perimeter channel 24 of the hexagonal nut 20 where after the tapered end 39 is inserted through the loop 34. The tapered end 39 is pulled through the loop 34 forcing the traverse ribs 38 to engage the circular grooves 31 thereby preventing the securing mean 30 from being removed from within the radial apertures 22 and the passage 14. This prevents the hexagonal nut 20 from rotating with respect to the fastener 12. When the user is required to remove the hexagonal nut 20 from the fastener 12, the above procedure is merely reversed allowing the securing means 30 to be removed from within the radial apertures 22 and the passage 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Locking Nut System comprising:
   a hexagonal nut having a plurality of radial apertures;
   a threaded fastener having a transverse passage therethrough, said threaded fastener being extended through said nut;
   a securing means for removably projecting through said radial apertures and through said traverse passage of said threaded fastener for preventing removal of said hexagonal nut from said threaded nut;

wherein said securing means comprises:

a length of wire for projecting through said radial apertures and through said passage of said threaded fastener; and said length of wire having a loop at one end, wherein said loop is larger than said radial apertures thereby preventing said loop from passing through said apertures, and wherein an end of said wire opposite of said loop removably projects through said radial apertures and said passage and removably engages said loop for preventing removal of said wire from within said apertures and said passage; and a protective coating surrounding said length of wire and said loop for preventing corrosion of said wire and for preventing injury to a user.

2. The Locking Nut System of claim 1, wherein said protective coating includes a plurality of traverse ribs opposite of said loop for engaging said loop.

3. The Locking Nut System of claim 2, wherein said protective coating includes a tapered end opposite of said loop.

4. The Locking Nut System of claim 3, wherein said protective coating surrounding said loop includes a plurality of circular interior grooves for catchably receiving said traverse ribs.

5. The Locking Nut System of claim 4, wherein said hexagonal nut includes a perimeter channel for receiving said securing means.

6. The Locking Nut System of claim 5, wherein said wire consists of a plurality of resilient wound wire strands.

7. The Locking Nut System of claim 6, including a protective cap for removably securing to said tapered end for preventing injury to said user.

8. A Locking Nut System, comprising:

a hexagonal nut having a plurality of radial apertures;

a threaded fastener having a transverse passage therethrough, said threaded fastener being extended through said nut;

a securing means for removably projecting through said radial apertures and through said traverse passage of said threaded fastener for preventing removal of said hexagonal nut from said threaded nut;

wherein said securing means comprises:

a length of wound wire strands for projecting through said radial apertures and through said passage of said threaded fastener; and said length of wire having a loop at one end, wherein said loop is larger than said radial apertures thereby preventing said loop from passing through said apertures, and wherein an end of said wire opposite of said loop removably projects through said radial apertures and said passage and removably engages said loop for preventing removal of said wire from within said apertures and said passage.

9. The Locking Nut System of claim 8, including a protective coating surrounding said length of wire and said loop for preventing corrosion of said wire and for preventing injury to a user.

10. The Locking Nut System of claim 9, wherein said protective coating includes a plurality of traverse ribs opposite of said loop for engaging said loop.

11. The Locking Nut System of claim 10, wherein said protective coating includes a tapered end opposite of said loop.

12. The Locking Nut System of claim 11, wherein said protective coating surrounding said loop includes a plurality of circular interior grooves for catchably receiving said traverse ribs.

13. The Locking Nut System of claim 12, wherein said hexagonal nut includes a perimeter channel for receiving said securing means.

14. The Locking Nut System of claim 13, including a protective cap for removably securing to said tapered end for preventing injury to said user.

\* \* \* \* \*